Oct. 20, 1970  J. W. MUIRHEAD  3,534,447
FILE FASTENER
Filed Jan. 15, 1969  2 Sheets-Sheet 1
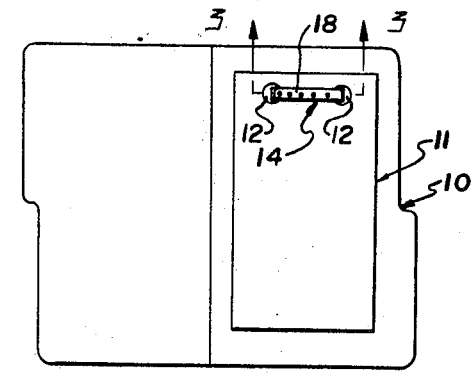
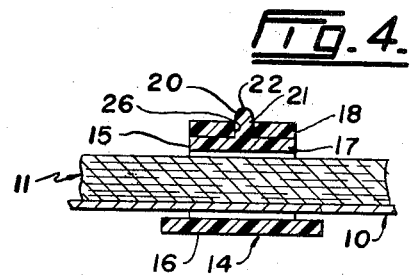
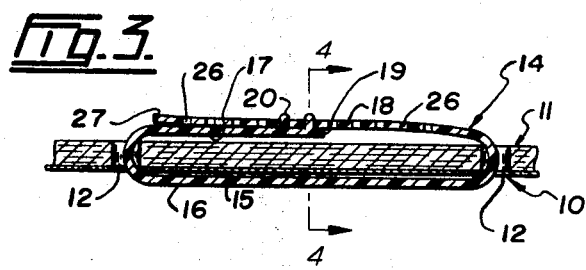
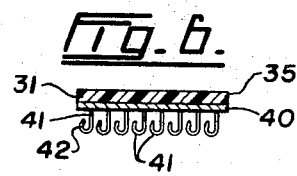
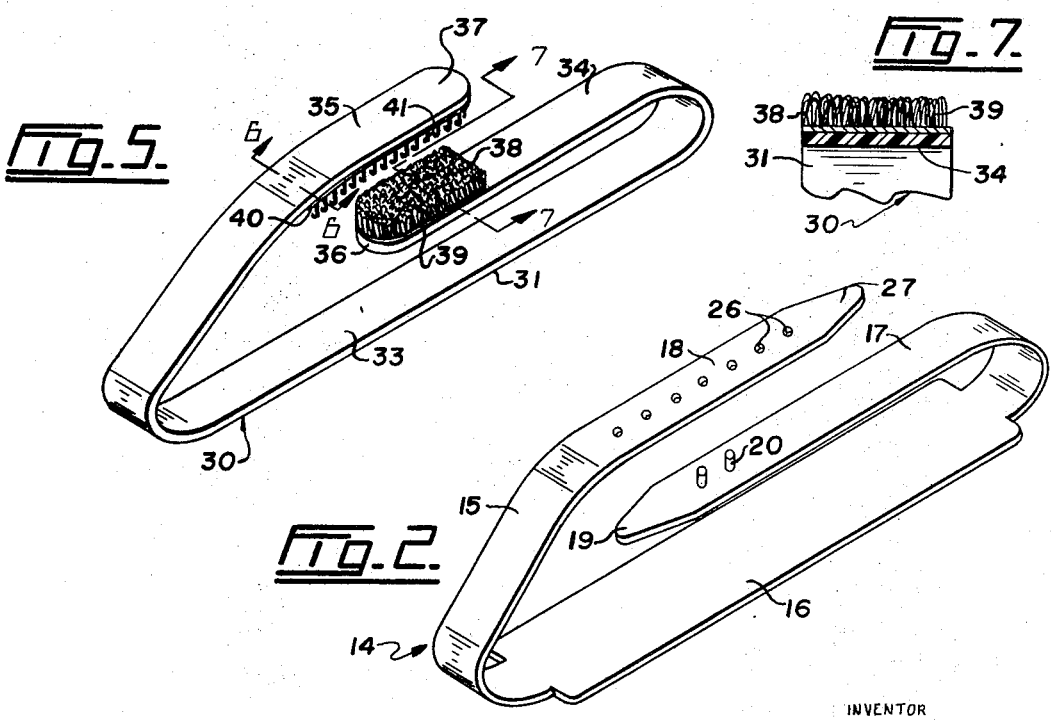
INVENTOR
JOHN W. MUIRHEAD
BY
Fetherstonhaugh & Co.
ATTORNEYS Oct. 20, 1970  J. W. MUIRHEAD  3,534,447
FILE FASTENER
Filed Jan. 15, 1969  2 Sheets-Sheet 2
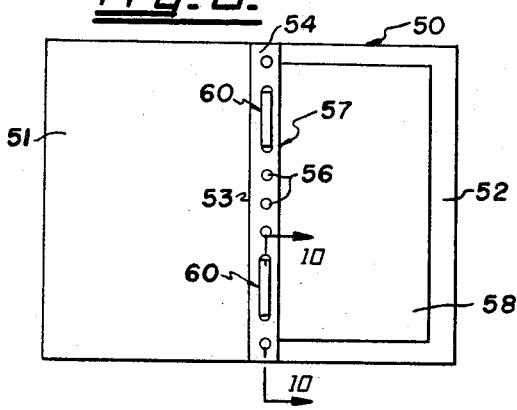
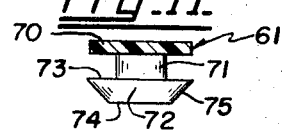
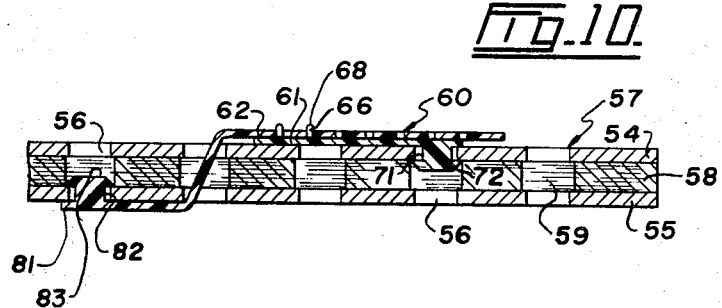
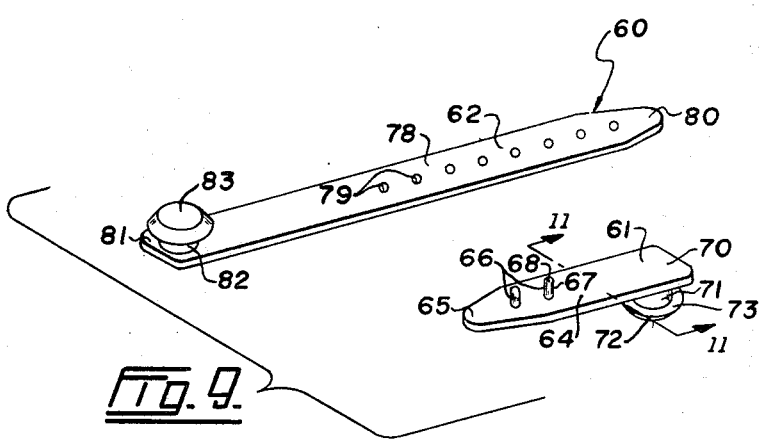
INVENTOR
JOHN W. MUIRHEAD
BY
Fetherstonhaugh & Co
ATTORNEYS :::center
United States Patent Office

3,534,447

Patented Oct. 20, 1970
:::

---

3,534,447
FILE FASTENER
John W. Muirhead, 3096 Paisley Road, North Vancouver,
British Columbia, Canada
Filed Jan. 15, 1969, Ser. No. 791,347
Int. Cl. A44b 9/00
U.S. Cl. 24—153                                3 Claims

ABSTRACT OF THE DISCLOSURE

A fastener having two flexible end portions, one being provided with longitudinally spaced studs and the other with similarly spaced openings which receive the studs and releasably connect the two portions. Each end portion has a laterally projecting head which can be snapped through one of a series of openings formed in a cover of a loose-leaf binder whereby to engage an inner surface of the cover and secure the end portion thereto. One end portion is threaded through a cover opening adjacent the head thereof to prevent complete separation of the covers and the leaves when the studs are withdrawn from the openings.

BACKGROUND OF THE INVENTION

This invention relates to fasteners which are particularly intended for use on file folders, binders, ledgers and the like.

A conventional file fastener in common use today is made up of a number of metal parts which are required to be folded and fitted together in a prescribed manner before the fastener will serve its intended purpose. The assembly of the device into a position of use takes some time and frequently one or more of the assembled parts will slip so that repeated adjustment is necessary. Also, it has been found that the metal parts are rough on the fingers during assembly. Because of these and other disadvantages, including the relatively high manufacturing cost, conventional file fasteners are not used as extensively as otherwise might be the case.

SUMMARY OF THE INVENTION

The present invention contemplates the use of a strip of a soft, non-metallic, flexible material having fastening members on one end portion and retaining means on the other end portion, the two end portions being adapted to be pressed into gripping engagement with one another. Once the two portions are engaged, they are unlikely to come apart during use but can easily be separated by a particular ripping motion whenever it is necessary to open the fastener. Such a fastener can be manipulated without discomfort to the fingers, is economical to produce and can be extended or contracted as required to provide a selection of fastener sizes.

BRIEF DESCRIPTION OF THE DRAWINGS

FIG. 1 is a plan view of one embodiment of the fastener shown, by way of example, in position of use on a file folder, FIG. 2 is a perspective view of such an embodiment, FIG. 3 is an enlarged section taken on the line 3—3 of FIG. 1, FIG. 4 is a detail section taken on the line 4—4 of FIG. 3, FIG. 5 is a perspective view of another embodiment of the file fastener, FIG. 6 is an enlarged section taken on the line 6—6 of FIG. 5, FIG. 7 is a similar section taken on the line 7—7 of FIG. 5, FIG. 8 is a plan view of still another embodiment of the invention which is shown by way of example, in position of use on a loose-leaf binder, FIG. 9 is a perspective view of the two parts which comprise this embodiment, FIG. 10 is an enlarged section taken on the line 10—10 of FIG. 8, and FIG. 11 is a transverse detail section, of the securing means on a fastener part, taken on line 11—11 of FIG. 9.

DESCRIPTION OF THE PREFERRED EMBODIMENTS

In FIG. 1, the numeral 10 generally indicates a conventional file holder of the type used to contain business letters and other sheet material, said sheets being indicated generally at 11. Suitably spaced openings 12 are punched through both the folder 10 and the sheets 11 to receive the present file fastener which is indicated generally by the numeral 14.

The file fastener 14, as illustrated by FIGS. 1 to 4 inclusive, is formed of a strip 15 of suitable flexible material, preferably a strong, hardwearing plastic. Such a strip can readily be threaded through the openings 12 and be folded upon itself as shown best in FIGS. 2 and 3. When so positioned, the strip 15 forms a flattened loop comprising a base portion 16 and overlapping end portions 17 and 18 which, desirably, are slightly narrower than said base portion.

End portion 17 is provided, near the tip 19 thereof, with studs 20. Preferably, two or more such studs are provided, the perpendicular studs being suitably spaced apart and arranged in a row along the centre of said end portion. The studs 20 are integrally formed with the plastic strip 15 to project outwardly from the end portion 17 a distance slightly greater than the thickness of said strip. As best shown in FIG. 4, the studs 20 have cylindrical sides 21 and rounded outer ends 22.

A plurality of openings 26 is formed in the end portion 18. The openings 26 extend from the tip 27 of the end portion to a point adjacent the base portion 16, the openings being arranged in a row along the centre of the strip. The centre to centre spacing of the openings 26 is the same as the centre to centre spacing of the studs 20, and also the openings are circular and have a diameter slightly less than the diameter of the studs.

From the foregoing, the operation of the file fastener is believed to be apparent. Briefly, the portions 17 and 18 are threaded through the openings 12 as previously mentioned and are drawn together to tie the sheets 11 to an adjacent part of the file folder 10. The end portions are then secured together, this being done by first placing the end portion 17 in contact with the top sheet of paper and then exerting endwise pressure on the portion 18 to align some of the openings 26 with the studs 20. End portion 18 is then pressed downwardly so that the studs 20 enter and project through the openings 26. It will be found that a slight resistance is offered to the entry of the studs 20 into the openings 26 since said studs are slightly oversize with respect to said openings. Thus, once the two end portions are united as described, they are unlikely to become separated during normal use of the file folder.

In order to unfasten the file fastener 14, a fairly sharp pull must be exerted on the tip 27. Such a pull snaps the studs 20 out of their openings 26 so that the end portions can be spread apart. When the fastener is opened in this manner, it is a simple matter to remove a sheet from the file folder or to add other sheets thereto whereupon the end portions can be secured together as before. Since the openings 26 extend the full length of the end portion 18 the size of the loop which is formed by the plastic strip 15 can readily be adjusted to accommodate almost any number of sheets 11 capable of being contained in the file folder 10. Thus, the fastener can be expanded to secure a large number of sheets or can be reduced in size as required to attach only a few sheets to the folder and in either case the sheets are snugly bound so as to be neatly contained within the folder at all times.

Referring now to the embodiment of FIGS. 5, 6, and 7, a file fastener 30 is provided which also is preferably formed of a strip 31 of plastic material. Strip 31 is foldable to provide a base portion 33, and end portions 34 and 35 having tips 36 and 37 respectively.

Secured to the top of the end portion 34, is a fibre strip 38 which preferably extends from the tip 36 to approximately midlength of said portion. The fibres of the strip 38 are formed into loops 39, see FIG. 7, and these looped fibres are matted together or intertwined so as to form a pile which preferably, is about ⅛ of an inch in thickness.

A band 40 is secured to the underside of the end portion 35, the band preferably being considerably longer than the fibre strip 38. The band 40 supports a plurality of hooks 41, the hooks being closely spaced and arranged in transversely extending rows as shown in FIG. 6. Each hook 41 is formed of a flexible loop of plastic or the like (FIG. 6), the hook having a barbless point 42.

The modified file fastener 30 is operated simply by pressing the band 40 into the fibre strip 38. As this is done, some of the hooks 41 enter some of the loops 39 and the remainder of said hooks become entangled in the fibres of the strip, so that the end portions 34 and 35 are not then easily separated. To open the file fastener 30 so as to permit the removal of a sheet 11, for example, the tip 37 is gripped between a thumb and forefinger and a pull is exerted on the end portion 35 to tear said portion away from the end portion 34. This movement causes the points 42 of the hooks to straighten out slightly to disengage the loops 39 and to tear away from the fibre strip 38 so that the two end portions can be separated. Repeated closing and opening of the fastener 30 does very little harm to either the hooks or the loops so that the modified fastener has a lengthy operational life as has the file fastener 14.

The fastener 30 is adjustable with regard to the size of the loop which is formed by the plastic strip in the same manner as the main embodiment of the invention, viz, the relatively long band 40 on the portion 35 allows the device to be increased or decreased in circumference to accommodate almost any desired number of sheets.

It should be noted that the hook and fibre means used to interlock the end portions of the modified file fastener is not considered by itself to be a novel part of the present invention. This particular means of fastening one part to another is quite well known and one such fastening device is marketed under the trade mark "Velcro" and is sometimes used as a substitute for slide fasteners.

A fastener formed of plastic as above described can be closed and reopened, over and over again, without danger of the material weakening or fracturing as a metal fastener would be likely to do. Since plastic is not crystallized by repeated bending in the same manner as metal the present fastener is reusuable for a much longer period than a conventional fastener which must be folded each time a sheet is added to or removed from a file folder.

The embodiment of the invention shown in FIGS. 8 to 11, is particularly intended for use on a loose-leaf binder of the type generally indicated by the numeral 50. Binder 50 consists of front and rear covers 51 and 52 both of which are creased along one side edge as at 53 to provide hinged flaps 54 and 55. Formed along the length of the flaps 54 and 55 is a plurality of registering openings 56, the openings being circular and suitably spaced apart. The flaps 54 and 55 combine to act as a support member 57 for a number of paper sheets 58 which are punched along one edge with openings 59, see FIG. 10, these openings being slightly larger than the openings 56 but having the same centre to centre spacing. When the punched edges of the sheets are placed between the flaps 54 and 55, the several openings are aligned to receive fasteners generally indicated at 60.

Preferably two fasteners 60 are used to secure the sheets 58 to the support member 57 of the binder, each fastener being comprised of members 61 and 62 both of which are formed of flat strips of a strong, hard-wearing and flexible plastic, see particularly FIG. 9. Member 61 has an end portion 64 which is provided with a tip 65. Near the tip 65, the end portion 64 has at least two centrally disposed and longitudinally spaced studs 66, the integrally formed studs having cylindrical sides 67 and rounded tips 68. At the opposite end 70, of the member 61, a short integral and perpendicular post 71 projects from the face of the plastic strip, opposite to the studs 66, this post being thick enough to be fairly rigid. The post 71 has a flattened integral head 72. As shown best in FIG. 11, the rounded head 72 has an inner face 73, an outer end 74, and a side edge 75. Edge 75 is reduced in width towards the end 74, preferably by means of a bevel although this edge may be rounded to provide the desired taper to the head. It will be noted that the maximum width of the head 72 is slightly greater than the diameter of the openings 56.

Member 62 has an end portion 78 which has a central row of openings 79, the openings extending from the tip 80 of said member to a point spaced from the opposite end 81 of the plastic strip. The spacing between the openings 79 is the same as the spacing between the studs 66 and the diameter of these circular openings is slightly less than that of said studs. End 81 is provided with a post 82 having a head 83, these parts being of exactly the same shape and construction as the corresponding parts on the member 61.

In order to secure the sheets 58 between the flaps 54 and 55 of the binder using two of the fasteners 60, a member 61 is placed on one end of the flap 54 with the tip 65 projecting away from the centre of the binder and with the head 72 positioned over an opening 56. Pressure is then exerted on the end 70 above the post 71 to force the head through the opening 56, this movement being facilitated by the reduced side edge 75 of the head and the slight natural resilience possessed by both the plastic head and the cardboard flap. Once the inner face 73 of the head moves beyond the corresponding face of the flap 54, said head and flap resume their normal positions. With the head thus lodged beneath the flap, the member 61 is secured in a position of use and cannot readily be detached from the binder.

A member 62 is then secured to the flap 55 in the manner shown in FIG. 10. The head 83 is inserted, as above described through an opening 56 suitably spaced from the member 61 attached to the flap 54. The flexible strip making up the member 62 is then threaded through the aligned openings 56 and 59 next to the head 83 so that the end portion 78 projects above the flap 54. When the end portions 64 and 78 are overlapped as shown best in FIG. 10, and the studs 66 are pressed through openings 79, the two flaps 54 and 55, as well as the sheets 58, are tied together at one end of the binder by the fastener 60. Another fastener 60 is applied in the same manner at the opposite end of the binder whereupon the covers 51 and 52, and the sheets 58, are bound together as a book. The members 61 and 62 which comprise each of the two fasteners 60, remain attached to the flaps of the binder and said members are easily separated, by simply pulling the tip 80 so as to spring the studs 66 out of the openings 79 in which they are retained, to permit some of the sheets 58 to be removed from the binder or other sheets added thereto.

The fastener 60 can be operated repeatedly to remove sheets from the binder or to add them thereto as required without damaging the plastic material or seriously reducing the effectiveness of the device.

What is claimed is:

1. A fastener for attaching sheets to a support member having a plurality of spaced openings on opposite sides thereof, said fastener comprising end portions formed of a strip of flexible material, a post on one end of each end portion, said posts each having a resilient head, said heads being shaped to snappingly engage an opening in one side of the support member and to allow the posts to be projected through support member openings on opposite sides of the support member and releasably retained therein by said heads, one of the end portions having a plurality of outwardly projecting studs, said studs being spaced apart and arranged in a row extending longitudinally of said one end portion, the other of said end portions having a plurality of openings, said openings being spaced and arranged to conform to the spacing and arrangement of the studs, said studs being adapted to be snapped into the openings to releasably secure the end portions together, one of the end portions extending along one side of the support member and being threaded through an opening therein adjacent the opening engaged by the post thereof so as to extend along the other side thereof.

2. A fastener as claimed in claim 1, in which said openings extend substantially the entire length of said other end portion, and said studs being relatively few in number and located on the extreme end of said one end portion.

3. A fastener as claimed in claim 1, in which each of said heads has an inner face and an outer end disposed in parallel relation to one another and a beveled side edge which tapers the head inwardly from said inner face to said outer end.

References Cited

UNITED STATES PATENTS

| | | | |
|---|---|---|---|
| 851,301 | 4/1907 | Morehouse | 402—15 |
| 1,345,750 | 7/1920 | Beaumont. | |
| 2,013,771 | 9/1935 | Tompkins. | |
| 3,086,529 | 4/1963 | Munz et al. | |
| 3,279,008 | 10/1966 | Wallach. | |
| 3,307,234 | 3/1967 | Murphy | 402—14 |

DONALD A. GRIFFIN, Primary Examiner

U.S. Cl. X.R.

402—14